United States Patent
Resconi et al.

(10) Patent No.: US 8,097,679 B2
(45) Date of Patent: Jan. 17, 2012

(54) COMPOSITIONS OF 1-BUTENE BASED POLYMERS

(75) Inventors: Luigi Resconi, Ferrara (IT); Davide Balboni, Ferrara (IT)

(73) Assignee: Basell Poliolefine Italia, Milan (IT)

( * ) Notice: Subject to any disclaimer, the term of this patent is extended or adjusted under 35 U.S.C. 154(b) by 0 days.

(21) Appl. No.: 12/735,953

(22) PCT Filed: Feb. 26, 2009

(86) PCT No.: PCT/EP2009/052274
§ 371 (c)(1),
(2), (4) Date: Aug. 27, 2010

(87) PCT Pub. No.: WO2009/115400
PCT Pub. Date: Sep. 24, 2009

(65) Prior Publication Data
US 2011/0003938 A1    Jan. 6, 2011

Related U.S. Application Data

(60) Provisional application No. 61/072,052, filed on Mar. 27, 2008.

(30) Foreign Application Priority Data

Mar. 20, 2008   (EP) ................................. 08153149

(51) Int. Cl.
C08F 8/00   (2006.01)
C08L 23/00   (2006.01)
(52) U.S. Cl. ........................... 525/191; 525/240
(58) Field of Classification Search ........... 525/191, 525/240
See application file for complete search history.

(56) References Cited

U.S. PATENT DOCUMENTS

| | | | |
|---|---|---|---|
| 3,894,120 | A | 7/1975 | Frese et al. |
| 4,309,522 | A | 1/1982 | Dietrich et al. |
| 5,221,715 | A | 6/1993 | Kagawa et al. |
| 5,698,487 | A | 12/1997 | Sacchetti et al. |
| 5,869,723 | A | 2/1999 | Hinokuma et al. |
| 6,288,192 | B1 | 9/2001 | Fujita et al. |
| 6,306,996 | B1 | 10/2001 | Cecchin et al. |
| 6,423,660 | B1 | 7/2002 | Albizzati et al. |
| 6,559,252 | B1 | 5/2003 | Horton et al. |
| 6,930,190 | B2 | 8/2005 | Nifant'ev et al. |
| 6,949,614 | B1 | 9/2005 | Schottek et al. |
| 6,953,829 | B2 | 10/2005 | Kratzer et al. |
| 6,998,458 | B2 | 2/2006 | Vitale et al. |
| 7,067,604 | B2 | 6/2006 | Minami et al. |
| 7,074,864 | B2 | 7/2006 | Resconi |
| 7,101,940 | B2 | 9/2006 | Schottek et al. |
| 7,112,638 | B2 | 9/2006 | Nifant'ev et al. |
| 7,141,527 | B1 | 11/2006 | Van Baar et al. |
| 7,459,511 | B2 | 12/2008 | Resconi |
| 7,557,161 | B2 | 7/2009 | Pelliconi et al. |
| 7,579,423 | B2 | 8/2009 | Resconi |
| 2004/0096682 | A1 | 5/2004 | Kanamaru et al. |
| 2006/0155071 | A1 | 7/2006 | Morini et al. |
| 2008/0004409 | A1 | 1/2008 | Bacci et al. |
| 2008/0269439 | A1 | 10/2008 | Resconi et al. |

FOREIGN PATENT DOCUMENTS

| | | |
|---|---|---|
| EP | 0 181 159 | 7/1988 |
| EP | 0 172 961 | 10/1988 |
| EP | 0 186 287 | 8/1990 |
| EP | 0 302 297 | 11/1991 |
| EP | 1 477 499 | 11/2004 |
| EP | 1 308 466 | 2/2007 |
| WO | WO 91/02012 | 2/1991 |
| WO | WO 92/00333 | 1/1992 |
| WO | WO 01/62764 | 8/2001 |
| WO | WO2004/050713 | 6/2004 |
| WO | WO2008/047860 | 4/2008 |

OTHER PUBLICATIONS

C. J. Carman, R. A. Harrington, and C. E. Wilkes, "Monomer Sequence Distribution in Ethylene-Propylene Rubber Measured by C NMR.3. Use of Reaction Probability Model," Macromolecules, vol. 10, No. 3, May-Jun. 1977, pp. 536-543.

V. Busico, R. Cipullo, and A. Borriello, "Regiospecificity of 1-butene polymerization catalyzed by C2-symmetric group IV metallocenes," Macromol. Rapid Commun. 1995, 16, pp. 269-274.

James C. Randall, "A Review of High Resolution Liquid Carbon Nuclear Magnetic Resonance Characterizations of Ethylene-Based Polymers," Macromol. Chem. Phys., C29(2&3), pp. 201-317 (1989).

Masahiro Kakugo, Yukio Naito, Kooji Mizunuma, and Tatsuya Miyatake, C NMR Determination of Monomer Sequence Distribution in Ethylene-Propylene Copolymers Prepared with $TiCl_3$ - $Al(C_2H_5)_2Cl$, Macromolecules, 1982, 15, pp. 1150-1152.

Primary Examiner — Nathan M Nutter
(74) Attorney, Agent, or Firm — Dilworth IP, LLC

(57) ABSTRACT

A 1-butene polymer composition comprising: a) from 10% to 90% by weight of an isotactic 1-butene polymer having the following features: i) isotactic pentad (mmmm) measured by $^{13}C$-NMR, higher than 90%; ii) melting point (TmII) higher than 90° C.; and iii) intrinsic viscosity (IV) measured in tetrahydronaphthalene (THN) at 135° C. comprised between 0.5 dl/g and 5.0 dl/g. b) from 90% to 10% by weight of a copolymer of 1-butene and at least a $C_8$-$C_{12}$ alpha-olefin derived units, containing from 0% to 10% by mole of propylene or pentene derived units, and/or containing from 0% to 5% by mole of ethylene derived units having a content of $C_8$-$C_{12}$ alpha-olefin derived units higher than 4.0% by mol and lower than 20.0% by mol; endowed with the following features: i) isotactic pentad mmmm higher than or equal to 90%; pentads (mmrr+mrrm) lower than 4 and pentad rmrr not detectable by C NMR. ii) intrinsic viscosity (IV) measured in tetrahydronaphthalene at 135° C. comprised between 0.8 and 5.0 dL/g; iii) the melting point measured by DSC (TmI) and the $C_8$-$C_{12}$ alpha-olefin content fulfil the following relationship: $TmI < 130 \times C^{-0.3}$ wherein C is the molar content of $C_8$-$C_{12}$ alpha-olefin derived units and TmI is the highest melting peak in the first melting transition; otherwise the melting point TmI is not detectable.

9 Claims, No Drawings

COMPOSITIONS OF 1-BUTENE BASED POLYMERS

CROSS-REFERENCE TO RELATED APPLICATIONS:

This application is the U.S. national stage under 35 U.S.C. §371 of International Application PCT/EP2009/052274, filed Feb. 26, 2009, claiming priority to EP Patent Application No. 08153149.3, filed Mar. 20, 2008 and U.S. Provisional Application No. 61/072,052, filed Mar. 27, 2008; the disclosures of International Application PCT/EP2009/052274, EP Patent Application No. 08153149.3, and U.S. Provisional Application No. 61/072,052, each as filed, are incorporated herein by reference.

The present invention relates to a composition comprising 1-butene homopolymer or 1-butene-ethylene or 1-butene-propylene copolymers and copolymers of 1-butene and higher linear alpha-olefins, such as 1-octene or 1-decene. The resulting blend is endowed with improved thermal properties and elasticity.

Butene-1 based polymers are well known in the art and have found application in several highly demanding end uses, thanks to their high pressure resistance, creep resistance, impact strength, and flexibility. These properties can be modified by the use of comonomers. In particular Butene-1 copolymers with a higher content of comonomer can be used for example as components of blends with other polyolefin or polymeric products, in order to modulate particular properties such as sealing strength, flexibility and softness of the plastic materials.

EP 186 287 relates to random 1-butene copolymers comprising from 50% to 99% mol of 1-butene. The copolymers are described with very broad ranges of properties. In particular the melting point ranges from 30 to 120° C. depending on the type and the amount of the comonomer used. It generically states that the 1-butene copolymers can be used in mixture with another themoplastic resins such as poly-1-butene.

EP 1 260 525 relates to 1-butene copolymers having among other features a stereoregularity index (mmmm)/mmrr+rmmr at most 20. The polymers of the present invention are not endowed with this feature. This document further relates in a quite generic way to compositions in which these copolymers can be used.

The applicant found that a composition comprising at least a copolymer of 1-butene and 1-octene or higher alpha olefins and a 1-butene based polymer is endowed with better thermal properties and elastic properties of the single components.

An object of the present invention is a 1-butene polymer composition comprising:
a) from 10% to 90% by weight of an isotactic 1-butene homopolymer or a copolymer of 1-butene and ethylene containing from 0 to 3% by mol of ethylene derived units and/or a copolymer of 1-butene and propylene containing from 0 to 15% by mol derived units, having the following features:
  i) isotactic pentad (mmmm) measured by $^{13}$C-NMR, higher than 90%;
  ii) melting point (TmII) higher than 90° C.; and
  iii) intrinsic viscosity (IV) measured in tetrahydronaphthalene (THN) at 135° C. comprised between 0.5 dl/g and 5.0 dl/g.
b) from 90% to 10% by weight of a copolymer of 1-butene and at least a $C_8$-$C_{12}$ alpha-olefin derived units, preferably at least 1-octene derived units, containing from 0% to 10% by mole of propylene or pentene derived units, and/or containing from 0% to 5% by mole of ethylene derived units having a content of $C_8$-$C_{12}$ alpha-olefin derived units higher than 4.0% by mol and lower than 20.0% by mol; endowed with the following features:
  i) isotactic pentad mmmm higher than or equal to 90%; pentads (mmrr+mrrm) lower than 4 and pentad rmmr not detectable by $^{13}$C NMR.
  ii) intrinsic viscosity (IV) measured in tetrahydronaphthalene at 135° C. comprised between 0.8 and 5.0 dL/g; preferably comprised between 0.9 and 3.0 dL/g;
  iii) the melting point measured by DSC (TmI) and the $C_8$-$C_{12}$ alpha-olefin content fulfil the following relationship:

$$TmI < 130 \times C^{-0.3}$$

wherein C is the molar content of $C_8$-$C_{12}$ alpha-olefin derived units and TmI is the highest melting peak in the first melting transition measured by DSC on a compression moulded plaque aged for 10 minutes in an autoclave at 2000 bar at room temperature and then aged for at least 24 hours at 23° C.; otherwise the melting point TmI is not detectable.

Preferably said 1-butene polymer composition has a the tension set at 100% of deformation (%) lower than the tension set at 100% of deformation (%) of a 1-butene copolymer having the same kind and amount of comonomer content of the resulting composition; preferably the tension set at 100% of deformation (%) of said 1-butene composition is 20% lower than the tension set at 100% of deformation (%) of 1-butene copolymer having the same kind and amount of comonomer content of the resulting composition; more preferably the tension set at 100% of deformation (%) of said 1-butene composition is 50% lower than the tension set at 100% of deformation (%) of 1-butene copolymer having the same kind and amount of comonomer content of the resulting composition.

For the purpose of the present invention the terms composition and blend are used with the same meaning to indicate a mixture of at least two polymers.

The isotactic 1-butene-based component a) is an isotactic homopolymer of 1-butene or a copolymer of 1-butene and ethylene containing from 0 to 5% by mol preferably 0.2 to 2% by mol of ethylene derived units or a copolymer of 1-butene and propylene containing from 0 to 15% preferably 0.2 to 5% by mol by mol of propylene derived units.

Component a) has preferably isotactic pentads (mmmm) measured by $^{13}$C-NMR, higher than 92%; more preferably higher than 95%.

The melting point of component a) (TmII) is preferably higher than 92° C.; more preferably the melting point is higher than 95° C.; even more preferably higher than 100° C.

The intrinsic viscosity (IV) measured in tetrahydronaphthalene (THN) at 135° C. is comprised between 0.5 dl/g and 4.0 dl/g; preferably it is comprised between 1.0 dl/g and 3.0 dl/g.

The isotactic 1-butene-based polymer useful as component a) according to the present invention can be obtained either by using a titanium-based catalyst system supported on $MgCl_2$ or by using a single-site based catalyst system such as for example a metallocene-based catalyst system. Useful processes for obtaining this kind of polymers are described for example in WO 99/45043; WO 03/099883 EP 172961, WO 02/100908, WO 02/100909 WO 03/014107 and WO2004/099269.

The copolymers of 1-butene component b) are preferably endowed with isotactic pentad mmmm higher than 92%, even more preferably mmmm are higher than 95%. The high isotacticity avoids the intrinsic stickiness of atactic or poorly isotactic polymers.

Preferably the melting point, when present, measured by DSC (TmI) and the $C_8$-$C_{12}$ alpha-olefin content fulfil the following relationship:

$$TmI < 130 \times C^{-0.35}$$

more preferably $TmI < 130 \times C^{-0.4}$

In the preferred embodiment component b) is a copolymer of 1-butene and at least a $C_8$-$C_{12}$ alpha-olefin derived units, preferably at least 1-octene derived units, containing from 0% to 2% by mole of propylene or pentene derived units, having a content of $C_8$-$C_{12}$ alpha-olefin derived units higher than 8% by mol and lower than 20% by mol, preferably from 8 to 12% by mol, further endowed with the following features:

iv) no detectable melting point TmII in the second melting scan;
v) The tensile modulus (TM) measured with DMTA in MPa and the comonomer content fulfill the following relationship:

$$TM < -14 \times C + 200$$

wherein C is the molar content of the $C_8$-$C_{12}$ alpha-olefin derived units;
vi) the tension set at 100% of deformation is lower than 55%; preferably lower than 50%.

Preferably in feature v) relationship is $$TM < -13 \times C + 180$$

Even more preferably the relationship is $$TM < -12 \times C + 150$$

Example of $C_8$-$C_{12}$ alpha-olefin to be used as comonomers in component b) are 1-octene, 1-decene, 1-dodecene. Preferably 1-octene and 1-decene are used, more preferably 1-octene is used.

Preferably in the 1-butene polymer composition, component a) ranges from 20% to 80% by weight and component b) ranges from 80% to 20% by weight; more preferably component a) ranges from 30% to 70% by weight and component b) ranges from 70% to 30% by weight.

The following compositions are also possible:

| component a) | component b) |
| --- | --- |
| 10-20% by weight | 90-80% by weight |
| 20-30% by weight | 80-70% by weight |
| 30-40% by weight | 70-60% by weight |
| 40-50% by weight | 60-50% by weight |
| 50-60% by weight | 50-40% by weight |
| 60-70% by weight | 40-30% by weight |
| 70-80% by weight | 30-20% by weight |
| 80-90% by weight | 20-10% by weight |

The composition of the present invention shows improved properties with respect to both component a) and component b) taken alone. In particular the composition of the present invention results in a material having a modulus equal to the weighted average of the moduli of the two components, but with a melting point quite close to that of the higher melting component. As a result the blend has an improved thermal stability and elastic properties.

The copolymers of the present invention component b) are prepared by using a metallocene-based catalyst system wherein the metallocene compound has a particular substitution pattern. Thus the 1-butene $C_8$-$C_{12}$ alpha-olefin copolymer object of the present invention can be obtained by contacting under polymerization conditions 1-butene and at least one $C_8$-$C_{12}$ alpha-olefin and optionally propylene or pentene, in the presence of a catalyst system obtainable by contacting:

(A) a stereorigid metallocene compound;
(B) an alumoxane or a compound capable of forming an alkyl metallocene cation; and optionally
(C) an organo aluminum compound.

Preferably the stereorigid metallocene compound belongs to the following formula (I):

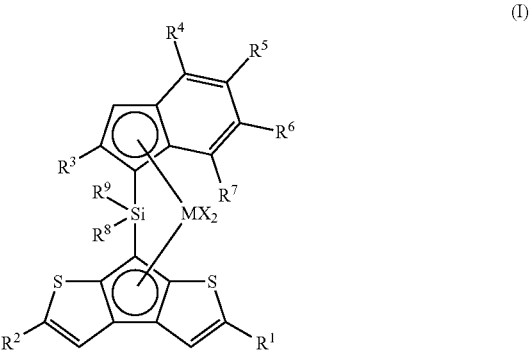

wherein:
M is an atom of a transition metal selected from those belonging to group 4; preferably M is zirconium;
X, equal to or different from each other, is a hydrogen atom, a halogen atom, a R, OR, OR'O, $OSO_2CF_3$, OCOR, SR, $NR_2$ or $PR_2$ group wherein R is a linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radical, optionally containing heteroatoms belonging to groups 13-17 of the Periodic Table of the Elements; and R' is a $C_1$-$C_{20}$-alkylidene, $C_6$-$C_{20}$-arylidene, $C_7$-$C_{20}$-alkylarylidene, or $C_7$-$C_{20}$-arylalkylidene radical; preferably X is a hydrogen atom, a halogen atom, a OR'O or R group; more preferably X is chlorine or a methyl radical;
$R^1$, $R^2$, $R^5$, $R^6$, $R^7$, $R^8$ and $R^9$, equal to or different from each other, are hydrogen atoms, or linear or branched, saturated or unsaturated $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing heteroatoms belonging to groups 13-17 of the Periodic Table of the Elements; or $R^5$ and $R^6$, and/or $R^8$ and $R^9$ can optionally form a saturated or unsaturated, 5 or 6 membered rings, said ring can bear $C_1$-$C_{20}$ alkyl radicals as substituents; with the proviso that at least one of $R^6$ or $R^7$ is a linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical;
preferably $R^1$, $R^2$, are the same and are $C_1$-$C_{10}$ alkyl radicals optionally containing one or more silicon atoms; more preferably $R^1$ and $R^2$ are methyl radicals;
$R^8$ and $R^9$, equal to or different from each other, are preferably $C_1$-$C_{10}$ alkyl or $C_6$-$C_{20}$ aryl radicals; more preferably they are methyl radicals;
$R^5$ is preferably a hydrogen atom or a methyl radical; or can be joined with $R^6$ to form a saturated or unsaturated, 5 or 6 membered ring, said ring can bear $C_1$-$C_{20}$ alkyl radicals as substituents;

R⁶ is preferably a hydrogen atom or a methyl, ethyl or isopropyl radical; or it can be joined with R⁵ to form a saturated or unsaturated, 5 or 6 membered rings as described above;

R⁷ is preferably a linear or branched, saturated or unsaturated $C_1$-$C_{20}$-alkyl radical, optionally containing heteroatoms belonging to groups 13-17 of the Periodic Table of the Elements; preferably a $C_1$-$C_{10}$-alkyl radical; more preferably R⁷ is a methyl or ethyl radical; otherwise when R⁶ is different from a hydrogen atom, R⁷ is preferably a hydrogen atom R³ and R⁴, equal to or different from each other, are linear or branched, saturated or unsaturated $C_1$-$C_{20}$-alkyl radicals, optionally containing heteroatoms belonging to groups 13-17 of the Periodic Table of the Elements; preferably R³ and R⁴ equal to or different from each other are $C_1$-$C_{10}$-alkyl radicals; more preferably R³ is a methyl, or ethyl radical; and R⁴ is a methyl, ethyl or isopropyl radical;

(A) an alumoxane or a compound capable of forming an alkyl metallocene cation; and optionally
(B) an organo aluminum compound.

Preferably the compounds of formula (I) have formula (Ia) or (Ib):

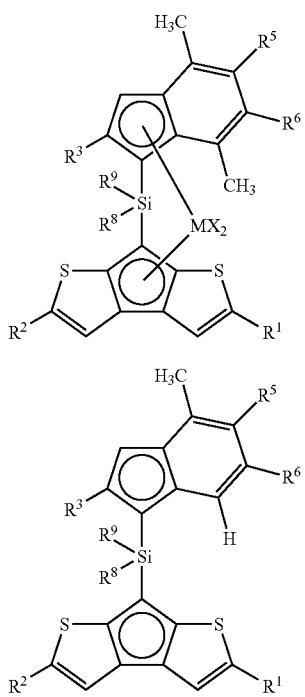

Wherein
M, X, R¹, R², R⁵, R⁶, R⁸ and R⁹ have been described above;
R³ is a linear or branched, saturated or unsaturated $C_1$-$C_{20}$-alkyl radical, optionally containing heteroatoms belonging to groups 13-17 of the Periodic Table of the Elements; preferably R³ is a $C_1$-$C_{10}$-alkyl radical; more preferably R³ is a methyl, or ethyl radical.

Alumoxanes used as component B) can be obtained by reacting water with an organo-aluminium compound of formula $H_jAlU_{3-j}$ or $H_jAl_2U_{6-j}$, where U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radical, optionally containing silicon or germanium atoms with the proviso that at least one U is different from halogen, and j ranges from 0 to 1, being also a non-integer number. In this reaction the molar ratio of Al/water is preferably comprised between 1:1 and 100:1. The molar ratio between aluminium and the metal of the metallocene generally is comprised between about 10:1 and about 20000:1, and more preferably between about 100:1 and about 5000:1. The alumoxanes used in the catalyst according to the invention are considered to be linear, branched or cyclic compounds containing at least one group of the type:

wherein the substituents U, same or different, are described above.

In particular, alumoxanes of the formula:

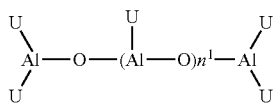

can be used in the case of linear compounds, wherein n¹ is 0 or an integer from 1 to 40 and the substituents U are defined as above, or alumoxanes of the formula:

can be used in the case of cyclic compounds, wherein n² is an integer from 2 to 40 and the U substituents are defined as above. Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO). Particularly interesting cocatalysts are those described in WO 99/21899 and in WO01/21674 in which the alkyl and aryl groups have specific branched patterns. Non-limiting examples of aluminium compounds according to WO 99/21899 and WO01/21674 are:

tris(2,3,3-trimethyl-butyl)aluminium, tris(2,3-dimethylhexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBAL), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formula (I) and $E^-$ is a compatible anion, which is able to stabilize the active catalytic species originating from the reaction of the two compounds, and which is sufficiently labile to be able to be removed by an olefinic monomer. Preferably, the anion $E^-$ comprises of one or more boron atoms. More preferably, the anion $E^-$ is an anion of the formula $BAr_4^{(-)}$, wherein the substituents Ar which can be identical or different are aryl radicals such as phenyl, pentafluorophenyl or bis (trifluoromethyl)phenyl. Tetrakis-pentafluorophenyl borate is particularly preferred examples of these compounds are described in WO 91/02012. Moreover, compounds of the formula $BAr_3$ can conveniently be used. Compounds of this type are described, for example, in the published International patent application WO 92/00333. Other examples of compounds able to form an alkylmetallocene cation are compounds of formula $BAr_3P$ wherein P is a substituted or unsubstituted pyrrol radicals. These compounds are described in WO01/62764. Other examples of cocatalyst can be found in EP 775707 and DE 19917985. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Tributylammoniumtetrakispentafluorophenylaluminate,
Tributylammoniumtetrakis(3,5-bis(trifluoromethyl)phenyl) borate,
Tributylammoniumtetrakis(4-fluorophenyl)borate,
N,N-Dimethylbenzylammonium-tetrakispentafluorophenylborate,
N,N-Dimethylhexylammonium-tetrakispentafluorophenylborate,
N,N-Dimethylaniliniumtetrakis(pentafluorophenyl)borate,
N,N-Dimethylaniliniumtetrakis(pentafluorophenyl)aluminate,
Di(propyl)ammoniumtetrakis(pentafluorophenyl)borate,
Di(cyclohexyl)ammoniumtetrakis(pentafluorophenyl)borate,
Triphenylcarbeniumtetrakis(pentafluorophenyl)borate,
Triphenylcarbeniumtetrakis(pentafluorophenyl)aluminate,
Ferroceniumtetrakis(pentafluorophenyl)borate,
Ferroceniumtetrakis(pentafluorophenyl)aluminate.

Organic aluminum compounds used as compound C) are those of formula $H_jAlU_{3-j}$ or $H_jAl_2U_{6-j}$ described above. The catalysts of the present invention can also be supported on an inert carrier. This is achieved by depositing the metallocene compound A) or the product of the reaction thereof with the component B), or the component B) and then the metallocene compound A) on an inert support such as, for example, silica, alumina, Al—Si, Al—Mg mixed oxides, magnesium halides, styrene/divinylbenzene copolymers, polyethylene or polypropylene. The supportation process is carried out in an inert solvent such as hydrocarbon for example toluene, hexane, pentane or propane and at a temperature ranging from 0° C. to 100° C., preferably the process is carried out at a temperature ranging from 25° C. to 90° C. or the process is carried out at room temperature.

A suitable class of supports which can be used is that constituted by porous organic supports functionalized with groups having active hydrogen atoms. Particularly suitable are those in which the organic support is a partially crosslinked styrene polymer. Supports of this type are described in European application EP-633272. Another class of inert supports particularly suitable for use according to the invention is that of polyolefin porous prepolymers, particularly polyethylene.

A further suitable class of inert supports for use according to the invention is that of porous magnesium halides such as those described in International application WO 95/32995.

The process for the polymerization of 1-butene and $C_8$-$C_{12}$ alpha olefins according to the invention can be carried out in the liquid phase in the presence or absence of an inert hydrocarbon solvent. The hydrocarbon solvent can either be aromatic such as toluene, or aliphatic such as propane, hexane, heptane, isobutane or cyclohexane. Preferably the copolymers of the present invention are obtained by a solution process, i.e. a process carried out in liquid phase wherein the polymer is completely or partially soluble in the reaction medium.

As a general rule, the polymerization temperature is generally comprised between 0° C. and +200° C. preferably comprised between 40° and 90° C., more preferably between 50° C. and 80° C. The polymerization pressure is generally comprised between 0.5 and 100 bar.

The lower the polymerization temperature, the higher are the resulting molecular weights of the polymers obtained.

The 1-butene composition object of the present invention can be obtained either by mechanically mixing components a) and b) i.e for example by co-extruding together component a) and b), by mixing the solutions of component a) and component b) and then removing the solvent, or by a reactor blend, i.e. in this case, the composition is produced directly in one or more reactors without the need of a mechanical blending.

When the composition of the present invention is produced directly in two or more reactors in series, different processes are possible, taking into account that component b) is produced by using a single-site based catalyst system and component a) can be produced either by using a titanium-based catalyst system supported on $MgCl_2$ or by using a single-site based catalyst system as described above.

For example, component a) can be obtained in a first step by using one or more reactors according to the processes described above and then, in a second step, the polymerization mixture can be fed to a second reactor or to a second group of reactors in series in which component b) is obtained.

The following examples are for illustrative purpose and do not intend to limit the scope of the invention.

EXAMPLES $^{13}C$ NMR Analysis $^{13}C$-NMR spectra were acquired on a DPX-400 spectrometer operating at 100.61 MHz in the Fourier transform mode at 120° C. The peak of the 2B2 carbon (nomenclature according to C. J. Carman, R. A. Harrington, C. E. Wilkes, Macromolecules 1977, 10, 535) of the mmmm BBBBB pentad was used as internal reference at 27.73. The samples were dissolved in 1,1,2,2-tetrachloroethane-$d_2$ at 120° C. with a 8% wt/v concentration. Each spectrum was acquired with a 90° pulse, 15 seconds of delay between pulses and CPD (WALTZ 16) to remove $^1H$-$^{13}C$ coupling. About 1500 transients were stored in 32K data points using a spectral window of 6000 Hz.

The composition of the 1-butene/higher olefin copolymers was calculated as follows using the $S_{\alpha\alpha}$ carbons:

$$XX=(S_{\alpha\alpha})_{XX}/\Sigma S_{\alpha\alpha}$$

$$BX=(S_{\alpha\alpha})_{BX}/\Sigma S_{\alpha\alpha}$$

$$BB=(S_{\alpha\alpha})_{BB}/\Sigma S_{\alpha\alpha}$$

Where B is 1-butene and X is the higher olefins.

The total amount of 1-octene and butene as molar fraction is calculated from diads using the following relations:

$$[X]=XX+0.5BX$$

$$[B]=BB+0.5BX$$

Assignment of the $^{13}C$ NMR spectrum of 1-butene/1-octene copolymers is reported in table A, with carbon labeling as shown in formula (a).

TABLE A

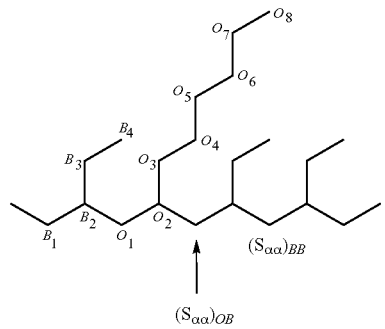

(a)

| Chemical shift | Assignment | Sequence |
|---|---|---|
| 41.43 | Sαα | OO |
| 40.82 | Sαα | OB |
| 40.22 | Sαα | BB |
| 35.66 | O3 | O |
| 35.00 | B2 | B |
| 33.69 | O2 | O |
| 32.23 | O6 | O |
| 30.19 | O5 | O |
| 27.73 | B3 | B |
| 26.88 | O4 | O |
| 22.89 | O7 | O |
| 14.19 | O8 | O |
| 10.88 | B4 | B |

Thermal Analysis

The melting temperatures and relative enthalpy of fusion of the polymers (TmI, TmII, $\Delta H_fI$, $\Delta H_fII$) were measured by Differential Scanning Calorimetry (DSC) on a Perkin Elmer DSC-1 calorimeter equipped with Pyris 1 software performing scans in a flowing $N_2$ atmosphere. DSC apparatus was previously calibrated at indium and zinc melting points with particular attention in determining the baseline with required accuracy. The preparation of the samples, for calorimetric investigations, was performed by cutting them into small pieces by using a cutter. The weight of the samples in every DSC crucible was kept at 6.0±0.5 mg.

In order to obtain the melting temperatures of the copolymers, the weighted sample was sealed into aluminium pans and heated to 180° C. at 10° C./minute. The sample was kept at 180° C. for 5 minutes to allow a complete melting of all the crystallites, and then cooled down to −20° C. at 10° C./minute. After standing 2 minutes at −20° C., the sample was heated for the second time to 180° C. at 10° C./min.

Melting temperature (TmI) and the relative enthalpy of fusion in the first heating DSC run were detected on compression-molded samples aged 10 minutes in the autoclave at high pressure (2000 bar) at room temperature and then aged at least 24 hours at 23° C.

The glass transition temperature ($T_g$) was also detected from DSC analysis in the second heating run from −90° C. up to 180° C. at 10° C./min. The weight of the samples in every DSC crucible was kept at 12.0±1.0 mg. The value of the inflection point of the transition was taken as the $T_g$.

Stress-Strain

Mechanical tests were performed with a mechanical tester apparatus (INSTRON 4301), following the international standard ISO 527/1.

Compression-molded samples were prepared by heating the samples at temperatures higher than the melting temperatures (200° C.) under a press for 5 minutes and then cooling the melt to room temperature with a cooling rate of 30° C./min. Before Mechanical testing, these compression molded samples were aged for 10 minutes in an autoclave (in water) at high pressure (2000 bar) at room temperature and then aged for additional 24 hours at 23° C. Rectangular specimens 30 mm long, 5 mm wide, and 2 mm thick were uniaxially drawn up to the break at room temperature at 500 mm/min and stress-strain curves were collected. For each sample, 6 stress-strain curves were collected and averaged. In this way stress at yield, elongation at yield, stress at break and elongation at break have been measured.

Tension Set Calculation

Compression-molded samples were prepared by heating the samples at temperatures higher than the melting temperatures (200° C.) under a press for 5 minutes and then cooling the melt to room temperature with a cooling rate of 30° C./min. Before performing the tensile measurements, these compression molded butene copolymers were aged for 10 minutes in an autoclave (water) at high pressure (2000 bar) at room temperature and then aged for additional 24 hours at 23° C. The values of the tension set were measured according to the method ISO 2285. Rectangular specimens 50 mm long, 2 mm wide, and 2 mm thick were uniaxially drawn from their initial length $L_0$ up to a length $L_f=2L_0$ i.e., up to the elongation $\epsilon=[(L_f-L_0)/L_0]*100=100\%$ (deformation rate not constant but high), and held at this elongation for 10 minutes, then the tension was removed and the final length of the relaxed specimens $L_r$ was measured after 10 minutes. The tension set was calculated by using the following formula:

$$t_s(\epsilon)=[(L_r-L_0)/L_0]*100.$$

The value of the tension set is the average of two measures.

DMTA

Tensile modulus (at 23° C.) has been measured by using DMTA. Seiko DMS6100 equipped with liq. $N_2$ cooling accessory instrument with heating rate of 2° C./min and frequency of 1 Hz. The specimens were cut from compression molded plaque with dimensions of 50×6×1 mm. The investigated temperature range was from −80° C. to the softening point.

Catalyst Preparation

Dimethylsilanediyl{(1-(2,4,7-trimethylindenyl)-7-(2,5-dimethyl-cyclopenta[1,2-b:4,3-b']-dithiophene)}Zirconium dichloride (Al) was prepared according to WO 01/47939. Methylalumoxane (MAO) was supplied by Albemarle as a 30% wt/wt toluene solution and used as such. Triisobutyla-luminium (TIBA) was supplied by Crompton as pure chemical and diluted to about 100 g/L with anhydrous cyclohexane. All chemicals were handled using standard Schlenk techniques.

Preparation of the Catalytic solution ($Al_{tot}/Zr=400$ molar, $Al_{MAO}/Zr=267$ mol/mol in cyclohexane/toluene)

22 mg of Al were charged at room temperature under nitrogen atmosphere into a 50 mL Schlenk flask, equipped with a magnetic stirrer. 16.2 mL of a mixture of MAO Albemarle 30% wt in toluene and TIBA in cyclohexane (25.3 g $Al_{tot}/L$; MAO/TIBA=2/1 molar) were added at room temperature under nitrogen atmosphere into the schlenk containing the Al ($Al_{MAO}/Zr=267$; $Al_{TIBA}/Zr=133$, $Al_{tot}/Zr=400$). The resulting clear orange-red solution, having a concentration of Al of 1.36 mg/mL, was stirred for 1-2 hours at room temperature and used as such in polymerizations.

Polymerization Test

The polymerization test were carried out in a 4.4 L jacketed stainless-steel autoclave equipped with a mechanical stirrer and a 35-mL stainless-steel vial, connected to a thermostat for temperature control, by using the following procedure. Prior to the polymerization experiment, the autoclave was purified by washing with a 1M Al(i-Bu)$_3$ solution in hexane and dried at 70° C. in a stream of nitrogen. Subsequently, an aliquot of a 25.3 g($Al_{tot}$)/L solution in toluene/cyclohexane of MAO/TIBA=2/1 molar corresponding to 4 mmol of Al, and 1122 g of 1-butene were charged at room temperature in the autoclave, which was then thermostated at 70° C. 2.8 mL of the catalyst system prepared above containing the catalyst/cocatalyst mixture (1.97 mg metallocene/mL solution) diluted with 5 mL of cyclohexane, was charged in the stainless-steel vial and injected into the autoclave by nitrogen overpressure. The polymerization was carried out at constant temperature for 20 minutes. After this, 300 g of 1-octene were injected into the autoclave by means of nitrogen pressure through the stainless-steel vial and the polymerization was carried out at constant temperature for 1 h. Then stirring was interrupted, the pressure into the autoclave was raised up to 20 bar-g with nitrogen, the bottom discharge valve was opened and the polymer/monomers mixture discharged into a heated steel tank containing water and treated for 10 min with a steam flow. The tank heating was switched off and a flow of nitrogen at 0.5 bar-g was fed to remove the water. The steel tank was finally opened, the wet polymer collected and dried overnight at 85° C. in an oven under reduced pressure. The polymerization results are reported in table 1.

In order to analyze the properties of component a) and component b) two separate polymerization runs have been carried out to produce the homopolymer component a) and the copolymer component b) equivalent to the ones produced in example 1, furthermore a 1-octene copolymer having the same molar content of comonomer of the composition has been produced. The polymerization runs have been carried out according to the following procedure.

Polymerization Tests

The polymerization tests were carried out in a 4.4 L jacketed stainless-steel autoclave equipped with a mechanical stirrer and a 35-mL stainless-steel vial, connected to a thermostat for temperature control, by using the following procedure. Prior to the polymerization experiment, the autoclave was purified by washing with a 1M Al(i-Bu)$_3$ solution in hexane and dried at 70° C. in a stream of nitrogen. Subsequently, the scavenger (an amount of a 25.3 g($Al_{tot}$)/L solution in toluene/cyclohexane of MAO/TIBA=2/1 molar corresponding to 4 mmol of Al) and then the desired amounts (see Table 1) of butene and octene were charged at room temperature in the autoclave. The autoclave was then thermostated at the polymerization temperature of 70° C. The solution containing the catalyst/cocatalyst mixture was injected in the autoclave by means of nitrogen pressure through the stainless-steel vial. The polymerization was carried out at constant temperature for 1 h, without feeding monomers.

Then stirring was interrupted, the pressure into the autoclave was raised up to 20 bar-g with nitrogen, the bottom discharge valve was opened and the polymer/monomers mixture discharged into a heated steel tank containing water and treated for 10 min with a steam flow. The tank heating was switched off and a flow of nitrogen at 0.5 bar-g was fed to remove the water. The steel tank was finally opened, the wet polymer collected and dried overnight at 85° C. in an oven under reduced pressure. The polymerization results are reported in table 1

TABLE 1

| Ex | mg of metallocene | Butene (g) | Octene (g) | Yield (g) |
|---|---|---|---|---|
| 1 | 1.9 | 1350 | 0 | 284 |
| 2 | 2.4 | 1122 | 300 | 259 |
| 3 | 1.9 | 1300 | 193 | 118 |
| 4* | 1.9 | 1122 | 300 | 255 |

| Ex | Octene in the polymer % mol ($^{13}$C NMR) | mmrr + mrrm % | mmmm % | rmmr | activity kg/g$_{MC}$/h | I.V. dL/g (THN) |
|---|---|---|---|---|---|---|
| 1 | 0 | <4 | >96 | nd | 150 | 1.7 |
| 2 | 7 | <4 | >96 | nd | 62 | 1.4 |
| 3 | 11 | <4 | >96 | nd | 102 | 1.6 |
| 4* | 7 | — | — | — | 99 | 1.4 | nd = not detectable;
*composition of the invention

The copolymers obtained in the above examples have been analyzed:

Thermal Analysis

Thermal analysis have been carried out according to the procedure described above, the results are reported in table 2:

TABLE 2

| Ex | T$_m$II (° C.) | ΔH$_f$II (J/g) | T$_c$ (° C.) | ΔH$_c$ (J/g) | T$_m$I ° C. | ΔH$_f$(I + II) (J/g) | T$_g$ ° C. |
|---|---|---|---|---|---|---|---|
| 1 | 103.3 | 33.3 | 60.2 | 30 | 119.8 | 69 | −28.8 |
| 2 | 45.6 | 0.4 | Nd | Nd | 51.8 | 19 | −36.5 |
| 3 | nd | 0 | Nd | Nd | 42.1 | 1 | −37.9 |
| 4* | 97.3 | 8 | Nd | Nd | 96.6 | 18 | −35.4 |

*composition of the invention
nd = not detectable

Mechanical Analysis

Stress-strain, tension set and tensile moduli measurements have been carried out according to the procedures described above. The results of the mechanical analysis are shown in table 3.

TABLE 3

| Ex | Tensile Modulus 23° C. DMTA (MPa) | stress @ break (MPa) | elongation @ break (MPa) | Tension set 100% deform.(%) |
|---|---|---|---|---|
| 1 | 360 | 19.3 ± 0.4 | 21 ± 1.0 | 67 |
| 2 | 59 | 2.2 ± 0.1 | 17 ± 1.5 | 45 |
| 3 | 0.6 | 0.2 | 150 ± 12 | 49 |
| 4* | 31 | 1.4 ± 0.1 | 30 ± 3 | 18 |

*composition of the invention

The composition of the invention has a tension set of 18% vs 45% that is the tension set of the copolymer of example 2 having the same kinds and amount of comonomer.

The invention claimed is:

1. A 1-butene polymer composition comprising:
   a) from 10% to 90% by weight of an isotactic 1-butene homopolymer or a copolymer of 1-butene and ethylene containing from 0 to 3% by mol of ethylene derived units and/or a copolymer of 1-butene and propylene containing from 0 to 15% by mol derived units, having the following features:
   i) isotactic pentad (mmmm) measured by $^{13}$C-NMR, higher than 90%;
   ii) melting point (TmII) higher than 90° C.; and
   iii) intrinsic viscosity (IV) measured in tetrahydronaphthalene (THN) at 135° C. is between 0.5 dl/g and 5.0 dl/g;
   b) from 90% to 10% by weight of a copolymer of 1-butene and at least a $C_8$-$C_{12}$ alpha-olefin derived units, containing from 0% to 10% by mole of propylene or pentene derived units, and/or containing from 0% to 5% by mole of ethylene derived units having a content of $C_8$-$C_{12}$ alpha-olefin derived units higher than 4.0% by mol and lower than 20.0% by mol; endowed with the following features:
   i) isotactic pentad mmmm higher than or equal to 90%; pentads (mmrr+mrrm) lower than 4% and pentad rmmr not detectable by $^{13}$C NMR,
   ii) intrinsic viscosity (IV) measured in tetrahydronaphthalene at 135° C. is between 0.8 and 5.0 dL/g;
   iii) the melting point measured by DSC (TmI) and the $C_8$-$C_{12}$ alpha-olefin content fulfill the following relationship:

$TmI<130\times C^{-0.3}$ wherein C is the molar content of $C_8$-$C_{12}$ alpha-olefin derived units and TmI is the highest melting peak in the first melting transition measured by DSC on a compression moulded plaque aged for 10 minutes in an autoclave at 2000 bar at room temperature and then aged for at least 24 hours at 23° C.; otherwise the melting point TmI is not detectable.

2. The 1-butene polymer composition according to claim 1 wherein the $C_8$-$C_{12}$ alpha-olefin is 1-octene.

3. The 1-butene polymer composition according to claim 2 wherein the 1-butene polymer composition has a tension set (%) at 100% of deformation lower than a tension set (%) at 100% of deformation of a copolymer having the same kind and amount of comonomer content of the resulting composition.

4. The 1-butene polymer composition according to claim 3 wherein the 1-butene polymer composition has a the tension set (%) at 100% of deformation 20% lower than the tension set (%) at 100% of deformation of a copolymer having the same kind and amount of comonomer content of the resulting composition.

5. The 1-butene polymer composition according to claim 4 wherein the melting point of component a) (TmII) is higher than 92° C.

6. The 1-butene polymer composition according to claim 5 wherein component b) is a copolymer of 1-butene and at least a $C_8$-$C_{12}$ alpha-olefin derived units, preferably at least 1-octene derived units, containing from 0% to 2% by mole of propylene or pentene derived units, having a content of $C_8$-$C_{12}$ alpha-olefin derived units higher than 8.0% by mol and lower than 20.0% by mol, further endowed with the following features:
   iv) no detectable melting point TmII in the second melting scan;
   v) The tensile modulus (TM) measured with DMTA in MPa and the comonomer content fulfill the following relationship:

$TM<-14\times C+200$ wherein C is the molar content of the $C_8$-$C_{12}$ alpha-olefin derived units;
   vi) the tension set at 100% of deformation (%) is lower than 55%.

7. The 1-butene polymer composition according to claim 6 wherein in feature v) relationship is $TM<13\times C+180$.

8. The 1-butene polymer composition according to claim 7 wherein component a) ranges from 20% to 80% by weight and component b) ranges from 80% to 20% by weight.

9. The 1-butene polymer composition according to claim 8 wherein component a) has preferably isotactic pentads (mmmm) measured by $^{13}$C-NMR, higher than 92%.

* * * * *